United States Patent Office 2,949,979
Patented Aug. 23, 1960

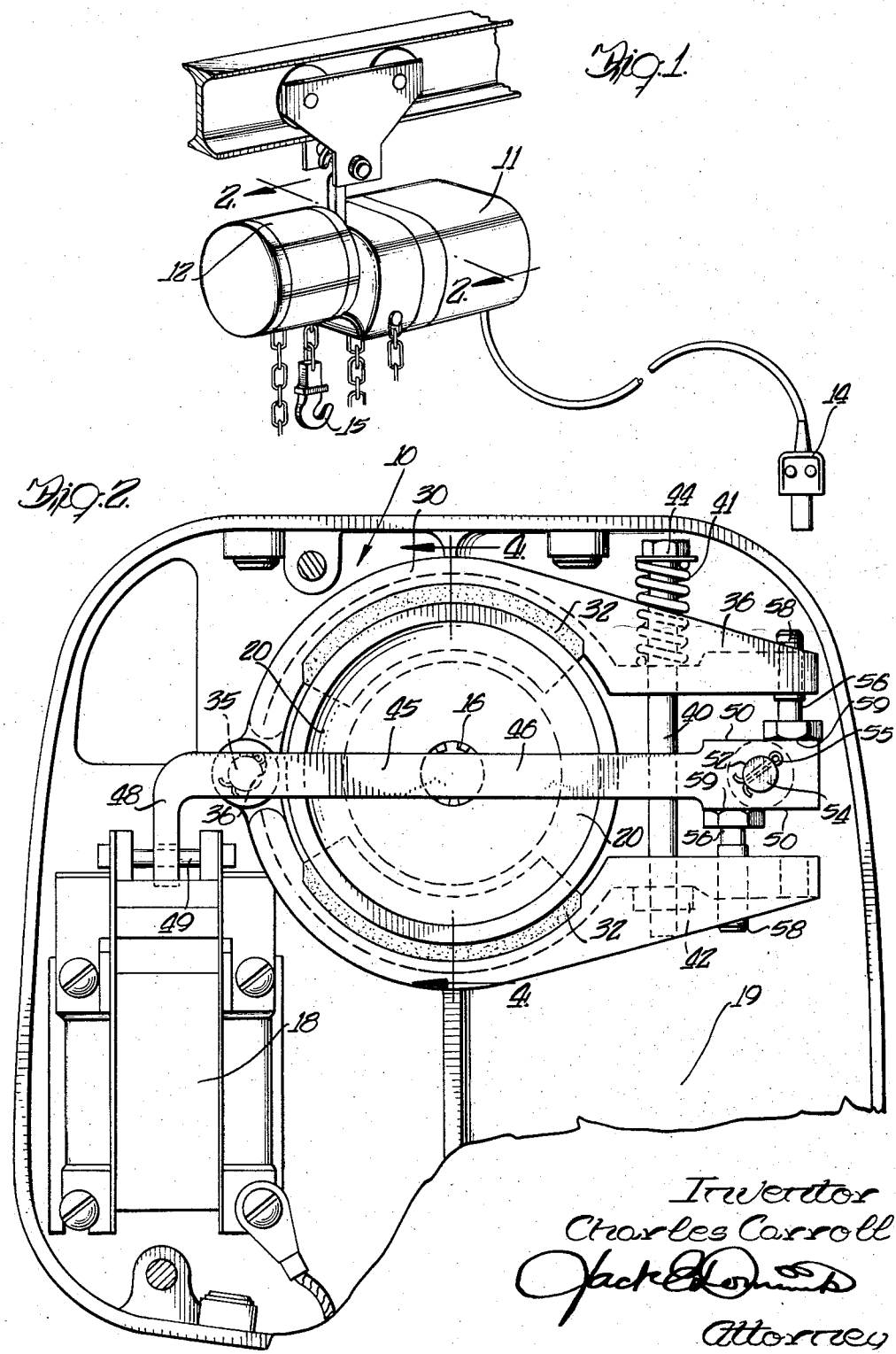

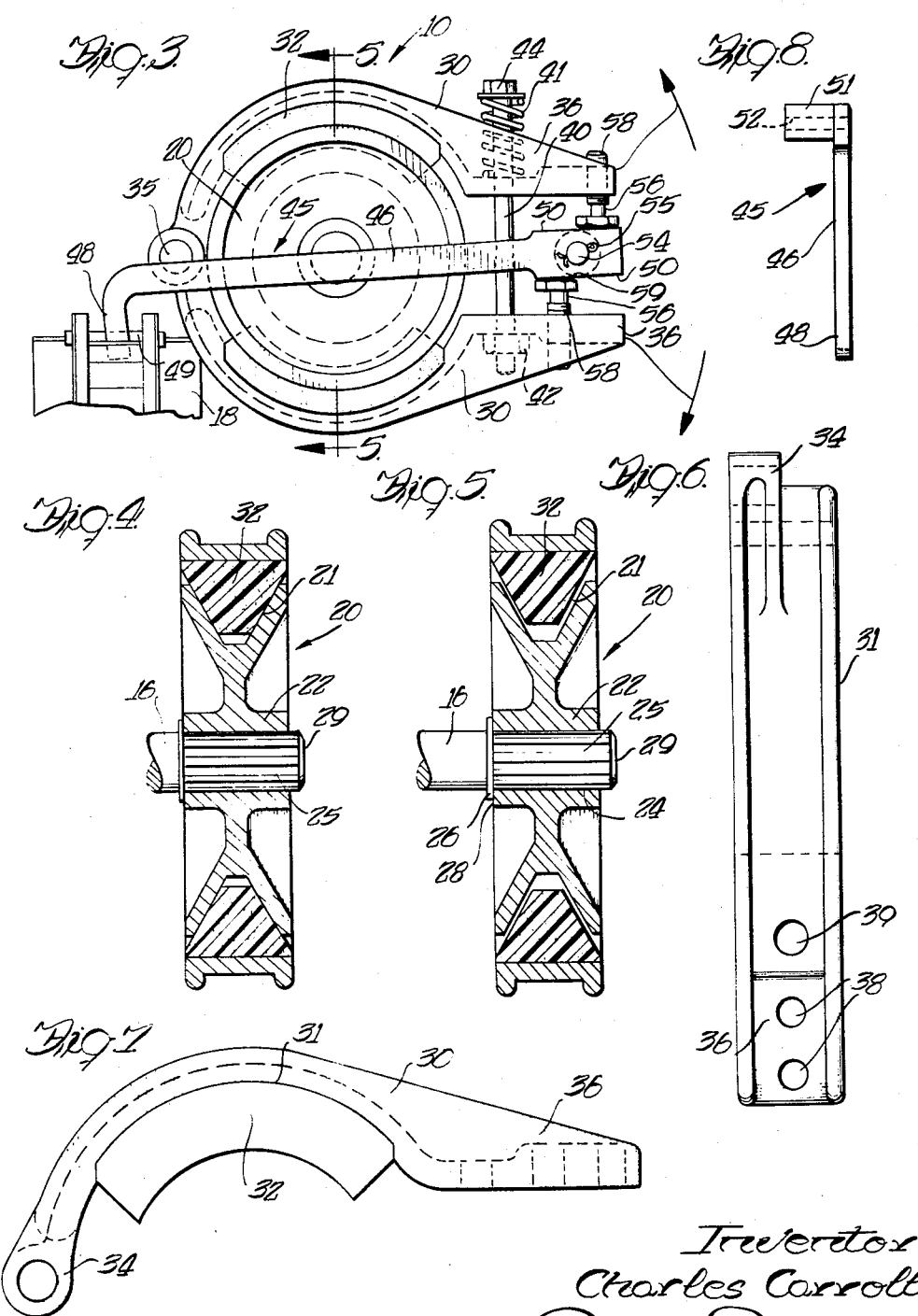

2,949,979
SAFETY BRAKE

Charles Carroll, Danville, Ill., assignor to Duff-Norton Company, Pittsburgh, Pa.

Filed Mar. 3, 1958, Ser. No. 718,731

2 Claims. (Cl. 188—77)

The present invention relates to a safety brake, and particularly to solenoid actuated type safety brakes intended for use on power-driven hoists and similar load-lifting devices.

Although the invention has numerous objectives, as will become apparent as a description of an illustrative embodiment proceeds, one of its principal advantages is to provide a safety brake of the irreducible minimum size for its braking capacity and safety requirements.

Another object of the invention is to furnish a safety brake with an inherently high mechanical advantage which permits the use of a smaller solenoid drive with an attendant reduction in power requirement and original cost.

A further object of the invention is to provide a safety brake, the inherent construction of which compensates for lining wear.

Still another object of the invention is to provide a safety brake which is fully and readily adjustable for loading to compensate for wear.

Yet a further object of the invention is to furnish a safety brake which is speedily assembled on its hoist construction with an irreducible minimum of tools, thereby reducing initial cost.

Further objects and advantages of the invention will become apparent as the following description of an illustrative embodiment proceeds, taken in conjunction with the accompanying drawings in which:

Figure 1 is a perspective partially broken view of a power-driven hoist of the type which may advantageously employ the safety brake illustrated.

Fig. 2 is an enlarged transverse section taken along section line 2—2 of Figure 1, showing the safety brake installation of the hoist pictured in Figure 1.

Fig. 3 is a partially broken view of the safety brake illustrated in Figure 1, shown in the released position.

Fig. 4 is a partially broken transverse section through the safety brake, taken along section line 4—4 of Fig. 2.

Fig. 5 is a transverse sectional view showing the safety brake in the released position and taken along section line 5—5 of Fig. 3.

Fig. 6 is an enlarged top view of one of the brake shoes.

Fig. 7 is an enlarged front elevation of the brake shoe shown in Fig. 6.

Fig. 8 is a top view of the brake actuating lever.

The basic mechanism of the illustrative safety brake includes a V-grooved drum, a pair of shoes with V-shaped lining and extending jaws, a reversely oriented lever arm, and a solenoid. The jaws of the shoes are spring-loaded in the locked position. A pair of adjustable pads extending from the jaw are driven by the cam end of the lever arm thereby spreading the jaws and releasing the brake. The long brake actuating lever arm cams the jaw pads at one end, and is actuated by a solenoid at the other end.

Referring now to the drawings, and particularly Figure 1, it will be seen that the subject safety brake assembly 10 finds advantageous employment in a power-driven hoist 11. Such hoists normally comprise an electric motor 12 controlled by a remote switching device 14. The drive shaft from the motor 12 powers a gear train which in turn drives a sprocket that lifts the chain supported hoisting hook 15. Because the chain supported hoisting hook 15 must carry substantial loads, it is essential that a braking device be employed to lock the hook 15 and its associated load at preselected elevations.

Referring now to Fig. 2, it will be seen that the motor drive shaft 16 is coupled to the safety brake assembly 10. Most safety brakes in such installations are coupled to the drive shaft of the motor because the maximum mechanical advantage is gained at that point. Since the maximum mechanical advantage is so achieved, the size and capacity of the safety brake may be proportionately reduced. As will be seen in the subject installation, the safety brake assembly 10 and its associated driving means, which in the present instance takes the form of a solenoid 18, are L-shaped in frontal area. This leaves an open area 19 for the installation of limit switches or other control devices which may be required in the installation.

The safety brake assembly itself is built around a drum 20 having a modified V-shaped peripheral groove 21. In the illustrated safety brake, the modified V-shaped peripheral groove 21, as shown in Figs. 4 and 5, is in the form of an isosceles trapezoid. The hub portion 22 of the drum 20 is an internal splined transverse bore 24 which mates with the splined end 25 of the motor drive shaft 16. A support washer 26 abuts against a drive shaft shoulder and the end 28 of the hub 22. For reasons which will be detailed hereinafter, a lock washer or other fastening means, is not required at the outer extremity 29 of the splined end 25 of the drive shaft 16.

A pair of brake shoes 30 are proportioned to embrace the brake drum 20. Each brake shoe 30 has a partial circular central portion 31 to which a modified V-shaped brake lining 32 is attached. At one end of the central circular portion 31, the brake shoe 30 is provided with a centrally bored boss 34 which is secured to a brake shoe pivot pin 35 by means of a cotter key 36, or other similar anchoring device. A jaw portion 36 extends forwardly from the central circular portion 31 and at the opposite end of the pivot support boss 34. The jaw portion is provided at its ends with a pair of threaded holes 38 and a through-bolt bore 39.

When the brake shoes 30 are placed in position and secured to the pivot pin 35, as illustrated in Fig. 3, a spring bolt 40 is passed through the through-bolt bore 39 and a compression spring 41 is preloaded by means of the adjusting nut 42 which pulls the bolt head 44 down against the compressing spring 41, thereby preloading the jaws 36 which engage the brake drum line 32 with the brake drum peripheral groove 31. Because the brake drum groove 21 and brake shoe lining 32 are essentially V-shaped, they are self-centering in operation. For this reason, no lock ring or other pulley centering mechanism is required on the end of the splined shaft 25. Indeed, the ability of the drum 20 to float slightly along the splined end 25 of the drive shaft 16 insures a uniform contact between the brake shoe groove 21 and the surface of the brake lining 32. Also, the employment of V-type brake lining and groove gives a maximum effective contact area between the lining and drum, in a minimum drum width. Further, a secondary self-energizing action takes place with the wedging of the lining into the V-shaped drum when the brake is applied.

From the foregoing it is apparent that the safety brake assembly 10 is constructed so that the brake is always set, that is, in the normal position the brake drum 20 is locked against rotation. When the power is applied to the motor 12, the braking action should be released on the drum 20 so that the drive shaft 16 can rotate and power the gear train to either raise or lower the load hook 15 and its associated load. To achieve this end, a solenoid 18 is provided which is coupled to a unique lever arm 45. The lever arm 45 has an elongate body portion 46 and an elbow 48 at one end which is bored to receive the coupling pin 49 of the solenoid 18. A pair of flat opposed faces 50 are provided at the end of the elongate body 46, also the elbow 48. The opposed faces 50 are ground on a laterally extending elbow 51 which has a central bore 52 to receive the cam pivot pin 54, the entire lever arm 45 being locked in place for movement about the pivot pin 54 by means of a cotter key 55, or similar locking element.

The opposed flat faces 50 are respectively raised and lowered at their ends when the solenoid is actuated, as shown in Fig. 3. By providing a novel pair of pads 56, which have a threaded shank portion 58 in threaded engagement with the threaded jaw holes 38, a fully adjustable pad face 59 contact with the cam face 50, may be achieved. The pads 56 are staggered fore and aft of the axis of the pivot pin 54 at an equal distance in each direction. The offset permits each brake shoe jaw 36 to appreciate an equivalent amount of separation when the solenoid 18 is actuated to pivot the cam faces 50 about the axis of the pivot pin 54. It will be noted that the lever arm 45 extends the full length of the brake shoes 32, thereby providing an unusually long lever arm, an excellent mechanical advantage for separating the brake shoes. By staggering the pads 56, an equal force is applied to each one when the solenoid is actuated. In addition, the length of the lever arm adopted permits placing the solenoid at the very end of the brake shoe assembly and in an offset relationship thereto, which, as best seen in Fig. 2, orients the entire unit in a minimum of space within the housing of the hoist 11.

In addition to the advantages pointed out above, and which are obvious from the description, the V-type brake permits a centrifugal drying and cleaning action of the braking surfaces which is not available when the braking surface is cylindrical in nature. As the brake drum 20 rotates with the brake shoe release, as shown in Fig. 5, dirt, moisture, oil and other impurities, may escape and, indeed, are driven off centrifugally through the space between the brake lining 32 and the V-shaped drum 21. This advantage, coupled with the secondary self-energizing action of a V-type brake construction in switching the brake lining into the drum V, makes for a most efficient and exceedingly safe construction, all within the reduced space requirement shown. In addition, by orienting the brake actuating lever arm 45 in a position where it doubles back over the length of the brake drum and shoe assembly, it reduces the space requirement for the safety brake assembly 10, without any mechanical advantage achieved through the solenoid drive which releases the brake. The floating mount of the brake drum further compensates for unequal wear, readily centers the drum for best braking action, and reduces the parts and labor required for original assembly, as well as field servicing. Unequal wear may be further compensated for by adjusting the pads 56 and the compression on the jaw spring 41.

Although particular embodiments of the invention have been shown and described in full here, there is no intention to thereby limit the invention to the details of such embodiments. On the contrary, the intention is to cover all modifications, alternative embodiments, usages and equivalents of the solenoid actuated type safety brakes intended for use on power-driven hoists and similar load-lifting devices, as fall within the spirit and scope of the invention, specification, and appended claims.

I claim as my invention:

1. A safety brake for an electric hoist having a rotatable shaft and a side wall portion in which said rotatable shaft is journaled comprising, in combination, a drum having a peripheral V-shaped groove, means on said rotatable shaft for mounting said drum, a pair of brake shoes, each of said brake shoes having a partial circular inner portion, V-shaped brake lining secured to the inner partial circular portions of the brake shoes and proportioned to engage the brake drum peripheral groove, a jaw portion extending from one end of each of said brake shoes, a pair of pivot means at the other end of each of said brake shoes, a single pin cooperating with the pivot means whereby the two brake shoes are pivotally connected, resilient compression means across the brake shoe jaws urging said jaws together thereby normally setting the brake shoe lining against the brake drum, a lever extending at least the length of the brake shoes, a pair of opposite flat faces at one end of the lever extending perpendicular thereto to a point between the jaws of said brake shoes, a single pivot for said lever oriented between said opposite flat faces and perpendicular with said hoist side wall, an elbow at the other end of said lever substantially perpendicular therewith, a solenoid coupled to the lever elbow to exert a force substantially perpendicular to said lever thereby respectively raising and lowering the opposed flat faces of the lever at its pivot point, a pad extending from each brake shoe jaw at staggered opposed stations, said stations being disposed longitudinally fore and aft of the lever pivot, the whole being proportioned and oriented so that the brake shoe release elements and the solenoid for actuating the same are at substantially diametrically opposite locations relative to the brake drum with the lever extending across the face of the brake drum.

2. A safety brake for an electric hoist having a rotatable shaft and a side wall portion in which said rotatable shaft is journaled comprising, in combination, a drum having a peripheral V-shaped groove, spline means on said rotatable shaft for receiving said drum, a pair of brake shoes, each of said brake shoes having a partial circular inner portion, V-shaped brake lining secured to the inner partial circular portions of the brake shoes and proportioned to engage the brake drum peripheral groove, a jaw portion extending from one end of each of said brake shoes, a pair of pivot means at the other end of each of said brake shoes, a single pin cooperating with the pivot means whereby the two brake shoes are pivotally connected, resilient compression means across the brake shoe jaws urging said jaws together thereby setting the brake shoe lining against the brake drum and simultaneously securing the drum against axial movement along its splined connection with the rotatable shaft, a lever arm extending at least the length of the brake shoes, a pair of opposed flat faces at one end of the lever arm extending perpendicular thereto to a point between the jaws of said brake shoes, a single pivot for said lever extending between said opposite flat faces and perpendicular with said hoist side wall, an elbow at the other end of said lever arm substantially perpendicular therewith, a solenoid coupled to the lever arm elbow to exert a force substantially perpendicular to said lever arm thereby respectively raising and lowering the opposed flat faces of the lever arm at its pivot point, and a pair of pads having threaded shank portions, each of said pads threaded shank portion engaging a brake shoe jaw at staggered opposed stations, said stations being disposed longitudinally fore and aft of the lever arm pivot, the whole being proportioned and oriented so that the brake shoe release elements and the solenoid for actuating the same are at substantially diametrically opposite locations relative to the brake drum with the lever extending across the face of the brake drum.

References Cited in the file of this patent

UNITED STATES PATENTS

| | | |
|---|---|---|
| 785,295 | Downie | Mar. 21, 1905 |
| 2,044,070 | Ewaldson | June 16, 1936 |
| 2,233,798 | Robins | Mar. 4, 1941 |
| 2,285,134 | Williams | June 2, 1942 |
| 2,696,365 | King | Dec. 7, 1954 |

FOREIGN PATENTS

| | | |
|---|---|---|
| 721,683 | France | Dec. 22, 1931 |
| 627,991 | Germany | Mar. 26, 1936 |
| 11,038 | Great Britain | May 26, 1905 |